Jan. 22, 1952 — F. HERRMANN — 2,583,264

CHUCK

Filed Aug. 20, 1946

Inventor:
Friedrich Herrmann
by Sommers & Young
Attorneys

Patented Jan. 22, 1952

2,583,264

UNITED STATES PATENT OFFICE 2,583,264

CHUCK

Friedrich Herrmann, Rorschach, Switzerland, assignor to Rigid Limited, Rorschacherberg, Switzerland Application August 20, 1946, Serial No. 691,776
In Switzerland August 27, 1945

2 Claims. (Cl. 90—11)

This invention relates to improvements in chucks, face-plates, mandrels and like removable rotary work and tool holders.

Chucks adapted in the manner of a bayonet-type tang- and socket fastener are known in the art. Such known holders, however, possess the disadvantage that in rough handling, as is usual in the average shop, the stud engaged in the groove is worn down. Further, such known holders require grooves adapted for tools which either are left-cutting or right-cutting or left-spiraled or right-spiraled, i. e. opposite-hand tools require different chucks or holders, and thus trade tools which are not provided with such grooves, cannot be used.

Such inconveniences and disadvantages are eliminated by the chuck or holder according to the present invention by disposing on the tool spindle at equal angular spacings, a plurality of clamping devices which in one position grasp a tool-holder to be held fast or the tool respectively from behind and release same in the other position, so as to permit of speedily exchanging the tool.

Figure 1:
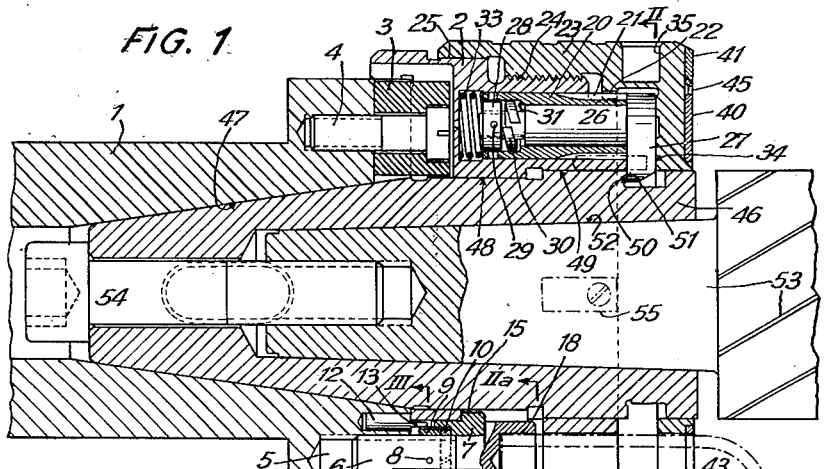
Figure 2:
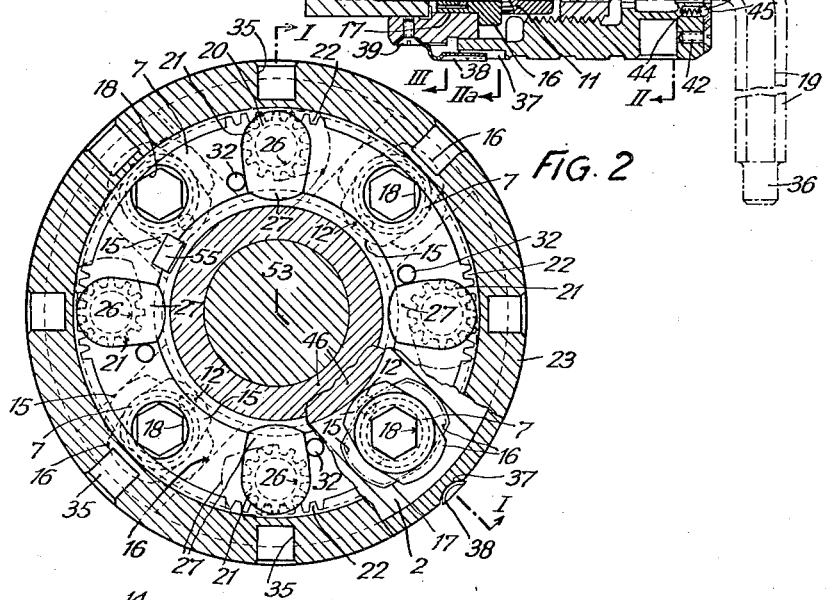
Figure 3:
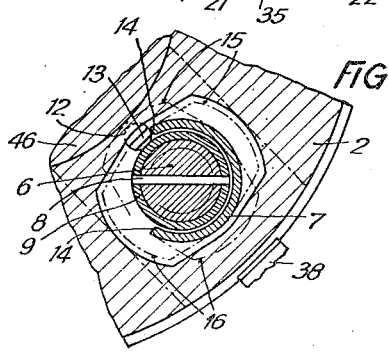

One embodiment of the invention is illustrated, by way of example, in the drawings, in which Fig. 1 is an axial section of a first form, on the line I—I of Fig. 2, Fig. 2 a cross-section on the line II—II and, partly, on line IIa—IIa of Fig. 1, and Fig. 3 a partial section on line III—III of Fig. 1.

In the example according to Figs. 1–3, a socket 2 is disposed on the end of the milling spindle 1 and secured against turning relative to the latter by means of two diametrically opposed driver blocks 3 which are secured to the spindle 1 by a cap screw 4 each and engaged in recesses of the spindle 1 and of the socket 2. A screw 6 each is disposed in the threaded bores 5 of the spindle, spaced at 90° from each other and co-acting with a clamping sleeve 7. A spring washer 10 is disposed on screw 6 intermediate of a nut 9 which is mounted on the screw 6 and held by a pin 8 and the clamping sleeve 7, pushing the latter up against the head 11 of the screw 6 so that the latter upon rotation tends to take the sleeve 7 along with it. The turning of the latter, however, is limited to a 90°-range by virtue of a stop pin 12 secured in the spindle 1, in that the nib 13 of pin 12 coacts with abutment faces 14 (Fig. 3) of a sector-shaped recess of the clamping sleeve 7. The latter comprises two cams 15, 16 and the socket 2 comprises a longitudinal passage 17 so that in the clamping position, shown in Fig. 2 by full lines, the cams 15, 16 grasp behind clamping faces of socket 2, which in the sleeve-position indicated in Fig. 2 by dash-and-dot lines, the cams may pass through the passage 17 so that the socket 2 in such position is released for removal. For the purpose of turning screw 6, its head 11 is provided with a hexagonal recess 18 to be engaged by a hexagonal socket wrench 19.

When slacking the screw 6 by means of the socket wrench 19, a slight running slack is set up at once, which permits of turning the clamping sleeve 7. The latter thus at once is turned from the clamping position through 90° into the slack-position, at the same time being axially displaced in correspondence with the pitch of screw 6, e. g., by 0.5 mm. at a pitch of 2 mm. The screw 6, after having turned the clamping sleeve 7 by 90°, may be slacked further still, a further turning of sleeve 7 being prevented by the stop pin 12, but the sleeve being further displaced axially. When all the four sleeves 7 thus have been slacked, the chuck socket 2 may be readily taken off the milling-spindle head.

When, in securing the socket 2, the screws 6 are tightened, the sleeves 7 are at once turned from the slack-position into the clamping position. When tightening up the screws 6 still further, the socket 2 is clamped fast on to the plane front-face of the milling spindle so that, after tightening up all the four screws 6, the socket 2 is securely anchored.

Since the sleeves 7 have to be turned through 90° only for opening and slacking and are axially displaced thereby in correspondence with the pitch of the screw 6 (e. g. by 0.5 mm. at a 2 mm.-pitch), the clamping and slacking is quickly performed. Slight differences of distance between the bearing shoulder of sleeve 7 on socket 2 and the bearing face of the latter on the front-face of the milling spindle 1 are of no importance.

Four bores to receive toothed pistons 20 are provided in the socket 2, intermediate of the clamping sleeves 7. Each piston 20 is provided with external teeth 21 engaged by the internal-tooth rim 22 of a threaded sleeve 23. The latter is provided with threads 24 and at 25 has a sliding fit on the socket 2. When turning sleeve 23, all the four pistons 20 are simultaneously turned, i. e. a slight turning of sleeve 23 is sufficient to produce, e. g., a 90°-rotation of the pistons 20. An axle pin 26 is mounted in the bore of each piston 20, and at one end is provided with a clamping cam 27, while at the other end a nut 28 is mounted thereonto, secured by a pin 29. A compression spring 30 at one end abuts against the said nut 28, and at the other end, against a shoulder 31 of the piston 20. The compression spring 30 forces the clamping cam 27 against the end of toothed piston 20 so that the axle pin 26 is carried along by friction with the cam 27 when the piston 20 rotates. The clamping cam 27 is adjustable in two positions, i. e. into the clamping position shown by full lines in Fig. 2, wherein the further rotation of the cam 27 is limited by a dog 32, and in the slack-position shown by dash-and-dot lines in Fig. 2, which latter position is limited by the abutment of clamping cam 27 in a recess of the threaded sleeve 23. When the ring 23 is turned, the toothed piston 20 is rotated by means of the gear teeth 21, 22 and by this means the clamping cam 27 can thus be turned from one end position to the other. Upon further rotation of the ring 23 the clamping cam will not be carried any further because of the dog 22; however, it will be moved axially. Further a compression spring 33 engages the piston 20, pushing the latter, together with the clamping cam 27 outwardly against an inner face 34 of the sleeve 23.

The latter further is provided with recesses 35 on its periphery, adapted to be engaged by the round end 36 of socket wrench 19, so as to permit of turning the sleeve 23 as is required for slacking and clamping the cams 27.

Further, the sleeve 23 is provided with four recesses 37 adapted to be engaged by a securing spring latch 38 which is fixedly attached to the socket 2 by screw 39 and which serves for adjusting the sleeve 23 so that the passage openings provided therein for the socket wrench 19 may be brought to register with the passage openings disposed in the socket 2 or, respectively to the screws 6 when the latter upon tightening or slacking the socket 2 have to be turned by means of the socket wrench 19. The securing spring 38 is of such strength as not to impair the turning of sleeve 23.

A protective ring 40, readily rotatable by hand, is mounted on the front-face of the threaded sleeve 23, and is held by a retainer ring 41 provided with a conical inner bore. The ring 41 is secured to the sleeve 23 by screws 42. The protective ring 40 is provided with four passage openings for the socket wrench 19. The said latter openings may be aligned with the passage openings in the sleeve 23 by pressing a ball 43, influenced by a spring 44, into an index opening 45 of the protective ring 40. When the socket 2 is fastly secured by tightening up the screws 6, the protective ring 40 is brought into an intermediate position wherein it blocks the passage openings of the sleeve 23 so that, during machining, filings or chips are prevented from entering into the socket 2.

The socket 2 described serves for grasping a socket inset 46 provided with an external conical face 47 which fits the internal conical face of the milling spindle 1. The inset 46 further is provided with two cylindrical external fitting faces 48, 49 corresponding with internal fitting faces of the socket 2, thus attaining an additional centering of the socket 2 and the inset 46. The latter, further, is provided with a front-face shoulder 50 with which the camming faces 51 of the cams 27 co-act so that the inset sleeve 46 is pressed fastly into the internal conical face of the milling spindle 1 in the clamping position of the cams 27. The inset 46 is provided with an internal conical face 52 wherein a tool 53, e. g. a milling tool, a twist drill and the like may be inserted and held fast, e. g., by a screw 54, whereby clamping tongues also, of course, might be used. The inset sleeve 46 is exchangeable and a plurality thereof is kept in stock, provided with different-size internal conical faces so as to permit of grasping different tools. The positive drive of the inset 46 is assured by the key 55 (Fig. 2). When taking off the inset sleeve 46, the threaded sleeve 23 is turned slightly counter-clockwise (Fig. 2) to provide a slight displacement between the shoulder 50 on the inset sleeve 46 and the camming faces 51 of the cams 27 giving rise to an engagement of the latter by the toothed pistons 20 and their turning through approximately 90° from the clamping position shown in full lines into the slack-position shown in Fig. 2 by dash-and-dot lines. The sleeve insets 47 now may be readily withdrawn from the socket 2. Although a very slight turning only of the threaded sleeve 23 is necessary for coercively and simultaneously rotating the four tightening-down cams 27, the slack or play between the shoulder face 50 of the sleeve inset 46 and the underside 51 of the clamping cams 27, becomes greater, according to the thread-pitch on the sleeve 23, when further turning the latter. In other words, it is not necessary to turn the sleeve 23 within definite limits, which fact permits of fastly securing different sleeve insets 46, the shoulder face 50 of which is not accurately located equal relative to the external conical face 47.

When inserting a new sleeve inset 46, the threaded sleeve 23 must be turned clockwise (Fig. 2) for the purpose of securing same. All the four clamping cams 27 then at once and simultaneously are turned from the open or slack position shown by dash-and-dot lines, into the hold-down position, and at the same time displaced somewhat axially. Upon further turning the threaded sleeve 23, the clamping cams 27 only are displaced axially to the left (Fig. 1), their undersides 51 acting upon the shoulder-face 50 of the sleeve inset 46 until the latter is clamped fast in the socket 2.

It will be readily seen that a sleeve inset 46 may be exchanged much quicker than the socket 2. An exchanging of the latter also is less frequent in operation, that the adjustment of the threaded sleeve 23 relative to the socket 2, required for introducing the socket wrench 19, and the loosening of the four screws 6 does not often have to take place.

Since the socket in such a chuck is secured without the aid of tie rods, it is not necessary to climb on top of the machine or to walk about same. When using tie rods, as known in the art, one always had to look for proper intermediate rings, which search required quite some time, and which, now, is eliminated. Further, it is no longer necessary to strike the tools loose, which is quite some nuisance, since now the outside conical face of the sleeve inset is being automatically slacked.

A substantial improvement of the chuck described further resides in the fact that, aside of the socket wrench and the sleeve insets, no loose parts are required for clamping or slacking the tools, thus saving much time, since less parts are liable to get lost and have to be looked for. Further, there is no risk of interchanging the parts inter se.

I claim:

1. In a chuck and tool spindle assembly, a socket secured to the tool spindle, a plurality of rotatable and axially movable hollow pistons axially mounted within said socket and equally spaced around the axis of the spindle, said pistons being provided with external gear teeth, a threaded sleeve screwed on an external threaded surface of said socket, said sleeve having an internal face extending transversely to the axis of the spindle, an internal gear rim on said sleeve in engagement with the gear teeth of all said pistons, a plurality of clamping cams each rotatably mounted in one of said hollow pistons and in frictional engagement therewith, whereby, upon rotation of said sleeve, said pistons are turned and cause said clamping cams to turn either into tool locking or tool releasing position, and means tending to urge the clamping cams towards said transverse internal face of the sleeve whereby the cams are axially moved when turning said sleeve for releasing the tool.

2. In a chuck and tool spindle assembly, a socket secured to the spindle, a plurality of rotatable follow pistons equally spaced within said socket around the axis of the spindle, a threaded sleeve engaged on the external threaded surface of said socket, said sleeve having an internal face extending transversely to the axis of the spindle, means operatively connecting said sleeve and said follow pistons to rotate said pistons about their axis upon rotation of said sleeve, a plurality of clamping cams each rotatably mounted in one of said pistons and frictionally engaged therewith, whereby upon rotation of said sleeve said pistons are turned and cause said clamping cams to simultaneously turn into tool locking or tool releasing position, and means tending to urge the clamping cams towards said transverse face of said sleeve whereby said cams are axially moved when turning said sleeve for releasing the tool.

FRIEDRICH HERRMANN.

REFERENCES CITED

The following references are of record in the file of this patent:

UNITED STATES PATENTS

| Number | Name | Date |
|---|---|---|
| 1,904,641 | Archea | Apr. 18, 1933 |

FOREIGN PATENTS

| Number | Country | Date |
|---|---|---|
| 424,999 | Great Britain | Mar. 5, 1935 |

OTHER REFERENCES

"Tool Engineering," pages 797 and 798, Nov. 17, 1921, Figs. 252 and 254.